(12) United States Patent
Lee

(10) Patent No.: US 12,302,225 B2
(45) Date of Patent: May 13, 2025

(54) ELECTRONIC DEVICE FOR CONTROLLING CONNECTION TO ACCESS POINT AND METHOD OF THE SAME

(71) Applicant: Samsung Electronics Co., Ltd., Gyeonggi-do (KR)

(72) Inventor: Sunghee Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 636 days.

(21) Appl. No.: 17/573,045

(22) Filed: Jan. 11, 2022

(65) Prior Publication Data
US 2022/0232459 A1    Jul. 21, 2022

Related U.S. Application Data

(63) Continuation of application No. PCT/KR2022/000178, filed on Jan. 5, 2022.

(30) Foreign Application Priority Data

Jan. 18, 2021    (KR) ........................ 10-2021-0006669

(51) Int. Cl.
*H04W 48/12*    (2009.01)
*H04W 48/16*    (2009.01)
(Continued)

(52) U.S. Cl.
CPC ........... *H04W 48/16* (2013.01); *H04W 48/20* (2013.01); *H04W 76/18* (2018.02)

(58) Field of Classification Search
CPC ..... H04W 48/16; H04W 48/20; H04W 76/18; H04W 84/12
See application file for complete search history.

(56) References Cited

U.S. PATENT DOCUMENTS 9,794,840 B1    10/2017    Tailor et al.
10,080,180 B2 *    9/2018    Burbidge .............. H04W 48/04
(Continued)

FOREIGN PATENT DOCUMENTS

CN    111565477 A    8/2020
JP    2014-519728 A    8/2014
(Continued)

OTHER PUBLICATIONS

Written Opinion dated Mar. 30, 2022.
International Search Report dated Mar. 30, 2022.

*Primary Examiner* — Ali S Abyaneh
(74) *Attorney, Agent, or Firm* — Cha & Reiter, LLC

(57) ABSTRACT

An electronic device according to an embodiment of the disclosure includes a communication circuit, a memory, and a processor configured to be operatively connected to the communication circuit and the memory. The processor may be configured to control the communication circuit to perform wireless communication through a first access point, to search for another access point while performing communication through the first access point, and attempt to connect to a candidate access point selected based on a block list stored in the memory, and to store, when a designated event occurs while attempting to connect to the candidate access point, a recovery condition configured according to a type of the designated event together with identification information of the candidate access point in the block list.

18 Claims, 15 Drawing Sheets

(51) Int. Cl.
   *H04W 48/20* (2009.01)
   *H04W 76/18* (2018.01)

(56) References Cited

U.S. PATENT DOCUMENTS

| | | | |
|---|---|---|---|
| 2001/0048744 A1* | 12/2001 | Kimura | H04W 12/069 |
| | | | 713/168 |
| 2004/0246922 A1* | 12/2004 | Ruan | H04W 48/20 |
| | | | 370/331 |
| 2005/0255847 A1* | 11/2005 | Han | H04W 36/00835 |
| | | | 455/442 |
| 2008/0075035 A1 | 3/2008 | Eichenberger | |
| 2009/0219832 A1* | 9/2009 | Velev | H04W 40/36 |
| | | | 370/254 |
| 2010/0075658 A1* | 3/2010 | Hou | H04W 48/02 |
| | | | 370/328 |
| 2011/0319079 A1 | 12/2011 | Nakata et al. | |
| 2012/0036557 A1 | 2/2012 | Li | |
| 2012/0324362 A1* | 12/2012 | Jung | G06F 11/3051 |
| | | | 715/738 |
| 2013/0090115 A1* | 4/2013 | Deivasigamani | H04W 48/20 |
| | | | 455/434 |
| 2014/0024375 A1 | 1/2014 | Fitzpatrick et al. | |
| 2017/0041835 A1* | 2/2017 | Takemoto | H04W 36/26 |
| 2018/0270728 A1 | 9/2018 | Van Oost et al. | |
| 2019/0289521 A1 | 9/2019 | Tang | |
| 2020/0137682 A1* | 4/2020 | Jia | H04W 52/02 |

FOREIGN PATENT DOCUMENTS

| | | |
|---|---|---|
| KR | 10-2014-0072186 A | 6/2014 |
| KR | 10-2017-0012430 A | 2/2017 |
| KR | 10-2017-0094438 A | 8/2017 |

* cited by examiner

ELECTRONIC DEVICE FOR CONTROLLING CONNECTION TO ACCESS POINT AND METHOD OF THE SAME

CROSS-REFERENCE TO RELATED APPLICATION(S)

This application is a continuation of International Application No. PCT/KR2022/000178, filed on Jan. 5, 2022, which claims priority to Korean Patent Application No. 10-2021-0006669, filed on Jan. 18, 2021 in the Korean Intellectual Property Office, the disclosures of which are herein incorporated by reference.

TECHNICAL FIELD

One or more embodiments disclosed herein generally relate to an electronic device for controlling connection to an access point. For example, one or more embodiments may relate to an electronic device for controlling connection to an access point according to a change in communication environment.

BACKGROUND ART

In short-range wireless communication technologies such as WiFi (wireless fidelity), there are physical limitations for a single access point (AP) used in the short-range communication network in which wireless Internet is accessed. For example, the AP may only cover a limited communication area.

Roaming technologies have recently been widespread such that multiple access points are distributed/installed across a physical space, thereby implementing a wide-area wireless network, and as terminals travel through the coverage area, new connections are generated from one access point to another access point via handoff protocols without breaking existing connections, thereby enabling electronic devices to use short-range communication networks in wider areas.

During roaming, an electronic device may select an access point from among discovered access points and attempts connection, but the connection may fail due to various problems occurring in the network, the access point, or the electronic device, and the electronic device may then repeat the search for access point. However, when the electronic device repeats the search for access point, connection failure may repeatedly occur if the electronic device again selects the same access point and attempts connection, due to a characteristic of roaming technology in which access points are typically selected based on the received signal strengths.

SUMMARY

An electronic device according to an embodiment disclosed herein may include a communication circuit, a memory, and a processor configured to be operatively connected to the communication circuit and the memory, wherein the processor is configured to control the communication circuit to perform wireless communication through a first access point, search for another access point while performing communication through the first access point, and attempt to connect to a candidate access point selected based on a block list stored in the memory, and store, when a designated event occurs while attempting to connect to the candidate access point, a recovery condition configured according to a type of the designated event together with identification information of the candidate access point in the block list.

A method of an electronic device according to an embodiment disclosed herein may include performing wireless communication through a first access point, searching for another access point while performing communication through the first access point, and attempting to connect to at least one candidate access point selected based on a block list stored in a memory of the electronic device, and storing, when a designated event occurs while attempting to connect to the at least one candidate access point, a recovery condition configured according to a type of the designated event together with identification information of the at least one candidate access point in the block list.

According to certain embodiments, if an electronic device attempts to connect to an access point discovered for roaming but fails to connect to the access point, the access point may be managed by using a block list, thereby preventing the occurrence of repeated connection failure.

According to certain embodiments, when an access point is managed by using a block list, power consumption caused by repeated connection failure may be reduced. According to certain embodiments, an electronic device may manage a block list regarding access points based on a network environment change, thereby reducing roaming failures, and enabling seamless communication connection.

BRIEF DESCRIPTION OF DRAWINGS

In connection with the description of the drawings, the same or similar reference numerals may be used for the same or similar components.

DETAILED DESCRIPTION

Certain embodiments disclosed herein may provide an electronic device configured such that, if the electronic device fails to connect to an access point in a plurality of access points discovered for roaming, the corresponding access point is managed by using a block list, thereby controlling connection to access points.

Certain embodiments disclosed herein may provide an electronic device configured such that, if the electronic device fails to connect to an access point in a plurality of access points discovered for roaming, a recovery condition is configured according to the cause of failure, and the corresponding access point is managed by using a block list, thereby controlling connection to access points according to a network environment change.

Figure 1:
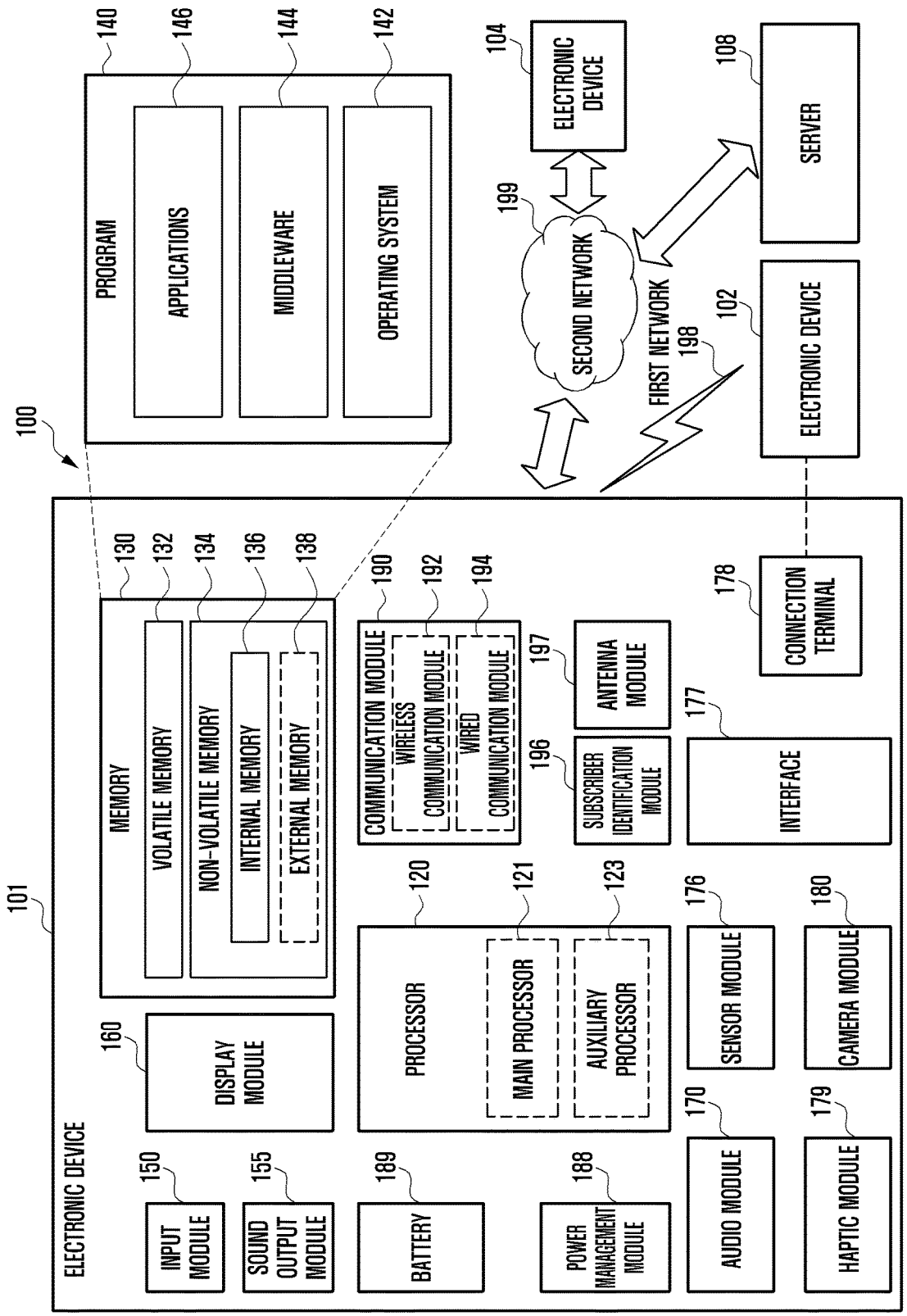
FIG. 1 is a block diagram illustrating an electronic device in a network environment according to an embodiment.

FIG. 1 is a block diagram illustrating an electronic device 101 in a network environment 100 according to an embodiment. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
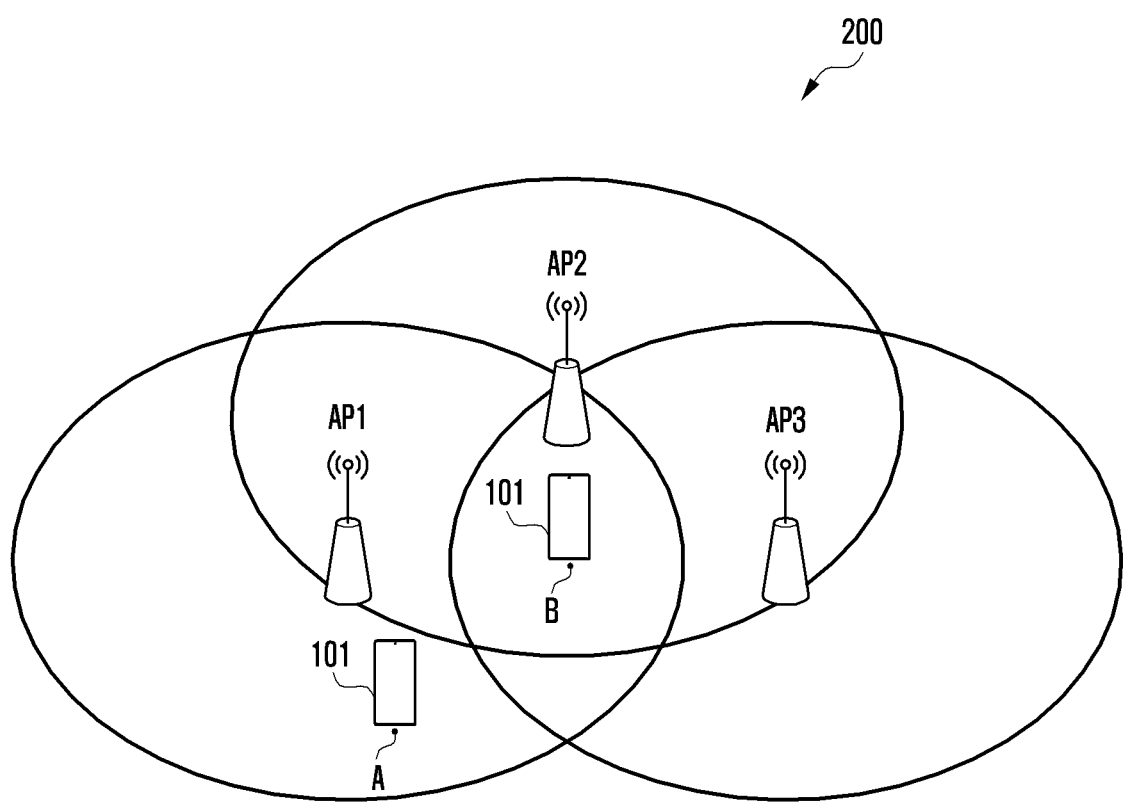
FIG. 2 is a diagram illustrating an electronic device in a wireless network environment including a plurality of access points according to an embodiment of the disclosure.

FIG. 2 is a diagram illustrating an electronic device in a wireless network environment including a plurality of access points according to an embodiment of the disclosure.

Referring to FIG. 2, a wireless network 200 (e.g., the first network 198 of FIG. 1) may include a plurality of access points installed within a corresponding area, for example, a first access point AP1, a second access point AP2, and a third access point AP3. In the embodiment of FIG. 2, the number of access points included in the wireless network is only an example and is not limited thereto, and the wireless network may include any number of access points. In one embodiment, access points constituting the wireless network may have the same service set identifier (SSID). In another example, the access points constituting the wireless network may have the same security format. For example, the wireless network may be a Wi-Fi communication network, and the access points may transmit and receive signals to and from an electronic device (e.g., the electronic device 101 of FIG. 1) using Wi-Fi communication technology.

According to an embodiment, the access point (e.g., the first access point AP1, the second access point AP2, and/or the third access point AP3) is, for example, a wireless sharing device constituting a wireless LAN, and may relay data between the electronic device 101 wirelessly connected to the access point and a wired LAN device (e.g., the server 108 of FIG. 1) connected to a network (e.g., the network 199 of FIG. 1 or the Internet). For example, the access point (e.g., the first access point AP1, the second access point AP2, and/or the third access point AP3) may connect the electronic device 101 to the Internet by bridging a wireless LAN port connected to the electronic device 101 and a wired LAN port connected to the Internet. For example, the wireless network may be a data communication network for transmitting and receiving various types of data such as text, digital images, or digital videos between the electronic device 101 and a server.

According to an embodiment, the electronic device 101 may perform authentication and association with at least one access point (e.g., at least one of the first access point AP1, the second access point AP2, and the third access point AP3) to establish a communication channel. For example, the access point (e.g., the first access point AP1, the second access point AP2, and/or the third access point AP3) may be connected to the electronic device 101 through one-to-one communication or one-to-many communication.

Figure 3:
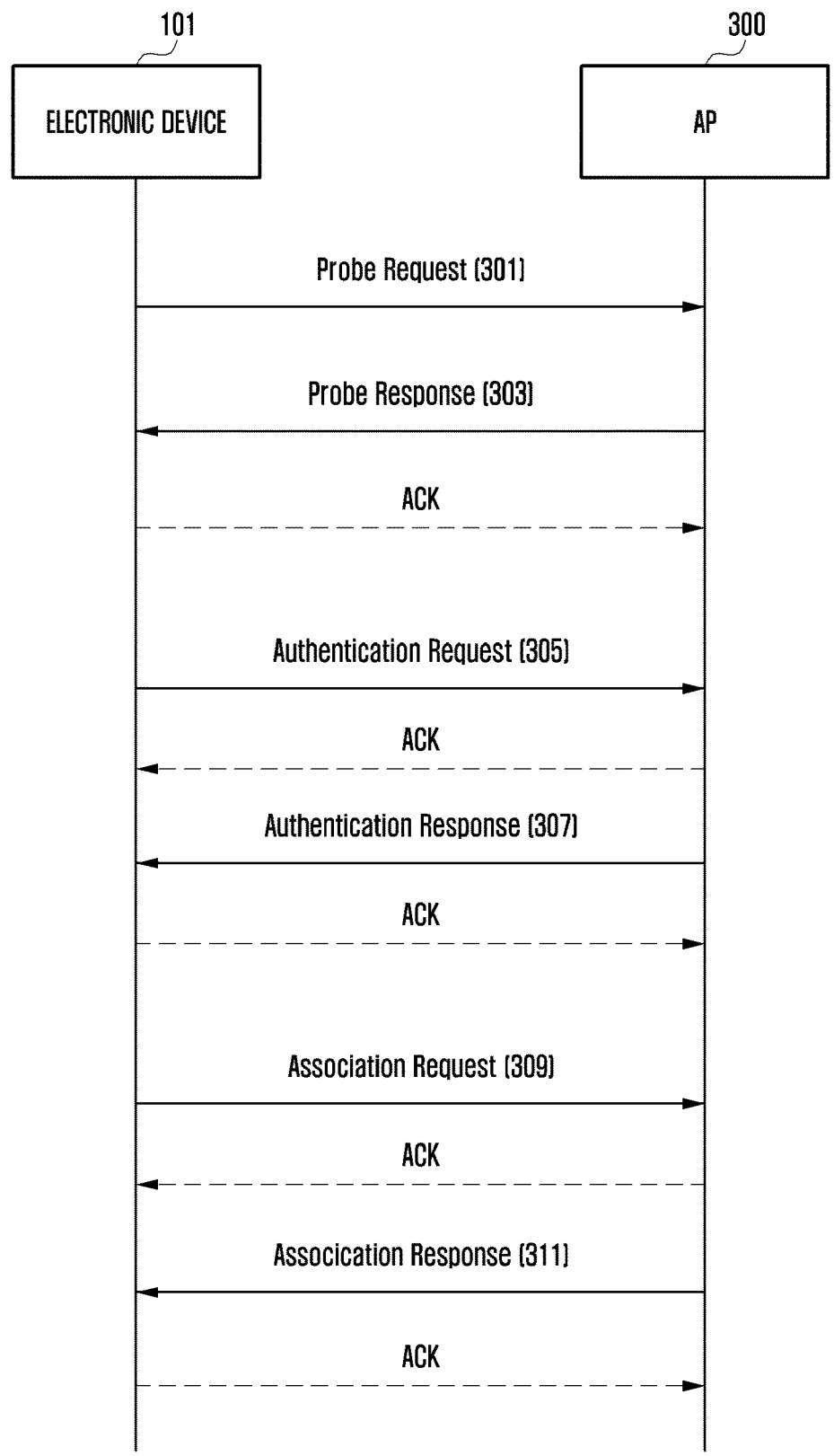
FIG. 3 is a signal flowchart for a connection operation between an electronic device and an access point according to an embodiment of the disclosure.

FIG. 3 is a signal flowchart for a connection operation between an electronic device and an access point according to an embodiment of the disclosure.

According to an embodiment, the electronic device 101 and an access point 300 (e.g., the first access point AP1, the second access point AP2, or the third access point AP3) may transmit various signals to each other, and may receive an acknowledgment (ACK) signal for the transmitted signal.

According to an embodiment, the electronic device 101 may perform a search operation (e.g., scanning) to search for an access point in order to be connected to a wireless network.

According to an embodiment, the electronic device 101 may periodically transmit a probe request frame 301 to search for an access point and may receive a probe response frame 303 from at least one access point 300 located within a communication distance range.

According to an embodiment, the electronic device 101 may receive a beacon signal (e.g., a beacon frame) periodically transmitted from the access point 300 to search for an access point. In FIG. 3, an example in which the electronic device 101 operates in active scan mode, transmits the probe request frame 301, and receives the probe response frame 303 in response thereto is illustrated. However, the instant disclosure also encompasses embodiments in which the electronic device 101 operates in passive scan mode by receiving a beacon signal generated in the access point 300 to search for an access point.

For example, the electronic device 101 may receive a first signal including a scan response signal (e.g., the probe response frame) or a beacon signal from the first access point AP1 and the second access point AP2.

For example, the first signal may include information on the access point, such as basic service set identifier (BSSID) for identifying an individual access point, service set identifier (SSID) for identifying an access point included in the wireless network, and security type information.

According to an embodiment, the electronic device 101 may select a candidate access point to be connected within the wireless network based on the received first signal. For example, the electronic device 101 may identify the SSID and the security type from the received first signal. In addition, the electronic device 101 may identify the communication quality of the access point based on the first signal, and may select the access point having the highest communication quality as the candidate access point. For example, the electronic device 101 may identify the communication quality by measuring the received signal strength, e.g. received signal strength indicator (RSSI), and/or the channel environment based on the first signal. For example, the electronic device 101 may select the access point having the greatest received signal strength (e.g., the first access point AP1) as the candidate access point based on the measured received signal strength.

Referring again to FIG. 3, the electronic device 101 may perform authentication and association request operations with the selected access point 300 to establish a communication channel and perform data communication.

For example, the electronic device 101 may transmit an authentication request frame 305 to the access point 300 (e.g., the first access point AP1) and may transmit an authentication response frame 307 corresponding thereto to perform the authentication operation.

For example, the electronic device 101 may transmit an association request frame 309 to the access point 300 (e.g., the first access point AP1), and may receive an association response frame 311 corresponding thereto to perform the association operation.

According to an embodiment, when the communication quality with the first access point AP1 deteriorates to a certain point while the electronic device 101 is connected to the first access point AP1 at a first location A, the electronic device 101 may perform scanning to search for another access point for communication. For example, when the electronic device 101 physically moves to another place (e.g., second location B) so that the distance from the first access point AP1 increases, or even when the electronic device 101 does not move from the first location A, for example, when an obstacle is presented between the electronic device 101 and the first access point AP1 or channel utilization increases, the communication quality with the first access point AP1 may deteriorate.

According to an embodiment, when identifying that the communication quality with the first access point AP1 has deteriorated, the electronic device 101 may search for a neighboring access point for roaming. For example, the electronic device 101 may transmit the probe request frame 301 including the same SSID and security format as the first access point AP1 to search for the neighboring access point for roaming at the second location B, and may receive the probe response frame 303 from the second access point AP2 and the third access point AP3 in addition to the first access point AP1. As another example, the electronic device 101 may receive another first signal from the second access point AP2 and the third access point AP3 in addition to the first signal from the first access point AP1 while scanning at the second location B.

According to an embodiment, the electronic device 101 may select a candidate access point to be reassociated for roaming from among the second access point AP2 and the third access point AP3 searched through scanning while the electronic device 101 is still connected to the first access point AP1. For example, the electronic device 101 may select, as the candidate access point, the access point having the highest communication quality from among the access points that can provide superior communication quality than the currently connected first access point AP1. For example, the electronic device 101 may select the access point (e.g., the second access point AP2) having the greatest RSSI at the current location (e.g., the second location B) as the candidate access point.

According to an embodiment, the electronic device 101 may perform an operation necessary for connection with the selected second access point AP2, for example, authentication and association request operations while performing still communicating with the first access point AP1.

According to an embodiment, while the electronic device 101 performs the association operation with the second access point AP2, for example, the authentication and association request operations, a phenomenon in which the electronic device 101 fails to connect to the second access point AP2 or repeats connection and disconnection (hereinafter, referred to as an event) may occur for various reasons.

According to an embodiment, when the event occurs while performing a connection operation with the second access point AP2, the electronic device 101 may store, for example, the second access point AP2 in a block list to exclude the second access point AP2 from being selected again as the candidate access point. For example, the electronic device 101 may store information for identifying the second access point AP2, for example, BSSID of the second access point AP2 in the block list.

According to an embodiment, the electronic device 101 may store the second access point AP2 in the block list, but may configure a recovery condition for deleting the second access point AP2 from the block list based on the event type that occurs during connection with the second access point AP2. For example, the recovery condition may include a condition for the SSID configured based on the event type and/or a condition for time such as a lifetime. For example, the electronic device 101 may store the BSSID of the second access point AP2 and the configured recovery condition together in the block list.

For example, the event type may include a type in which a signal, for example a response frame is not received from the second access point AP2 in an authentication or association request process. In another example, the event type may include a type in which, for example, a response (e.g., a reject signal) for rejecting the connection is received from the second access point AP2 in the authentication or association request process. In yet another example, the event type may include a type in which connection and disconnection with the second access point AP2 are repeated within a designated time period after the connection with the second access point AP2 is established.

According to an embodiment, the electronic device 101 may select the candidate access point other than the second access point AP2 stored in the block list in the access points scanned for roaming, for example, the third access point AP3. For example, the electronic device 101 may perform a connection operation by excluding the second access point AP2 and selecting the third access point AP3 as the candidate access point.

According to an embodiment, the electronic device 101 may identify the recovery condition of the second access point AP2 in the block list, and may delete the second access point AP2 from the block list when the recovery condition is satisfied.

According to an embodiment, when the second access point AP2 included in the block list is scanned, the electronic device 101 may identify the recovery condition of the second access point AP2 in the block list and may delete the recovery condition when the recovery condition is satisfied, thereby allowing the second access point AP2 to be selected as the candidate access point again.

According to an embodiment, when there is no access point that can be selected as the candidate access point when the second access point AP2 is excluded by being listed in the block list, the electronic device 101 may identify the recovery condition of the second access point AP2 from the block list, and may delete the second access point AP2 from the block list when the recovery condition is satisfied, thereby selecting the second access point AP2 as the candidate access point.

According to an embodiment, the electronic device 101 may identify the recovery condition of the second access point AP2 in the block list, and may stop a roaming operation and may not re-perform the same when the recovery condition is not satisfied and there is no access point to be selected as the candidate access point. For example, the electronic device 101 may maintain the connection with the first access point AP1 and may re-perform the roaming operation after a designated time period or when a designated condition (e.g., an RSSI value is equal to or less than a threshold value) is satisfied.

According to an embodiment, when the connection with the second access point AP2 is successful, the electronic device 101 may perform communication through the second access point AP2. Accordingly, the connection with the previously connected first access point A1 may be terminated. Without additional user input, the electronic device 101 may perform communication through the same wireless network regardless of switching of the connection with the access point.

Figure 4:
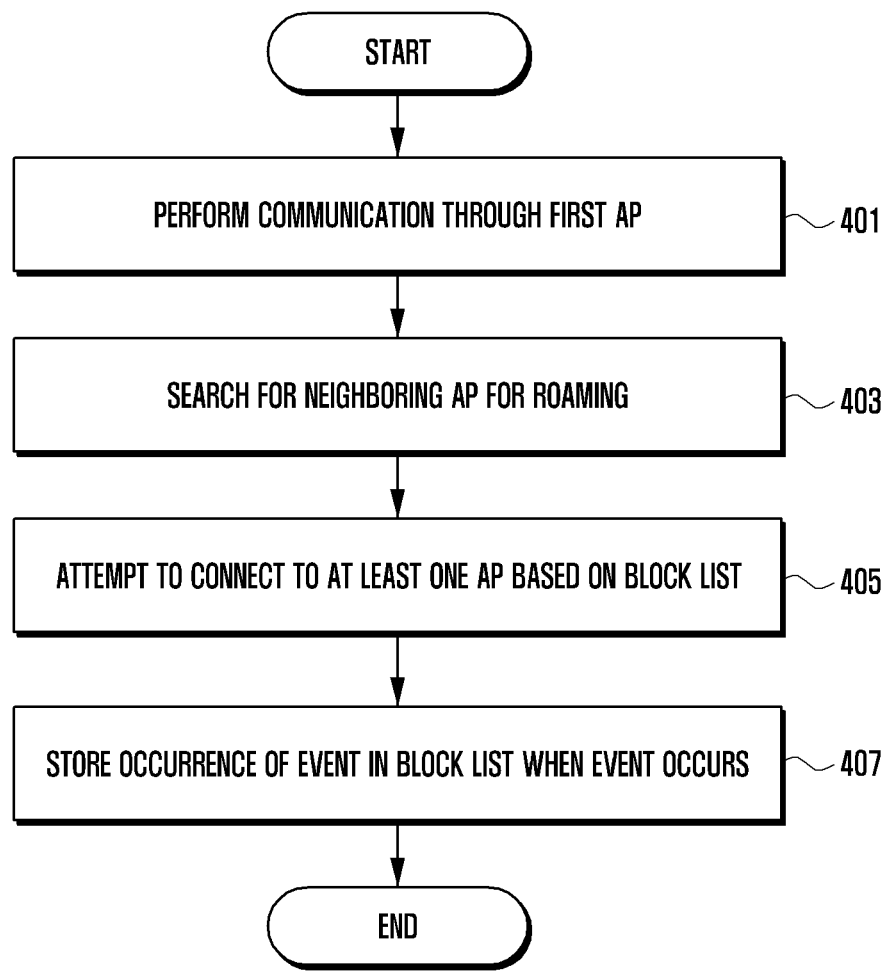
FIG. 4 is a flowchart illustrating a method of controlling a connection with an access point by an electronic device according to an embodiment of the disclosure.

FIG. 4 is a flowchart illustrating a method of controlling a connection with an access point by an electronic device according to an embodiment of the disclosure.

Referring to FIG. 4, in operation 401, an electronic device (e.g., the electronic device 101 of FIG. 1) according to an embodiment may be connected to a wireless network existing within a configured communication range, for example, the first access point AP1 of FIG. 2 to perform data communication through the first access point AP1.

According to an embodiment, in operation 403, the electronic device 101 may search for (e.g., scan) another access point while performing communication through the first access point AP1. For example, when the communication quality with the first access point AP1 deteriorates, the electronic device 101 may search for a neighboring access point for roaming. For example, the electronic device 101 may broadcast a scan request signal, and may receive a scan response signal from the neighboring access point existing in the communication range in response thereto or receive a beacon signal periodically transmitted by the neighboring access point existing within the communication range. For example, the electronic device 101 may receive the scan response signal or the beacon signal from the second access point AP2 and the third access point AP3 of FIG. 2 by searching for the neighboring access point.

According to an embodiment, in operation 405, the electronic device 101 may select a candidate access point among the searched neighboring access points based on a block list and may attempt to connect with the selected candidate access point.

For example, the electronic device 101 may select the candidate access point from among the searched second access point AP2 and third access point AP3 while excluding access points stored in the block list. For example, when the third access point AP3 is currently stored in the block list, the electronic device 101 may exclude the third access point AP3, and may select, as the candidate access point, the access point satisfying the condition of the candidate access point from among the remaining access points. For example, the condition of the candidate access point may be configured based on the received signal strength. For example, the received signal strength may be measured as RSSI, and may be identified by measuring the received signal strength of the scan response signal or the beacon signal received from the access point. For example, the condition of the candidate access point may include an RSSI higher than at least a designated value compared to the RSSI of the currently connected access point (e.g., the first access point API).

For example, the electronic device 101 may perform a connection operation with the selected candidate access point. For example, the electronic device 101 may exclude the third access point AP3 stored in the block list from among the searched access points and may perform a connection operation with the selected second access point AP2 based on the RSSI.

According to an embodiment, the electronic device 101 may identify a recovery condition for an access point stored in the block list, and may delete the corresponding access point from the block list when the recovery condition is satisfied. For example, the electronic device 101 may periodically identify the recovery condition for the access point stored in the block list. As another example, the electronic device 101 may identify the recovery condition for the access point stored in the block list at the time of selecting the candidate access point for roaming. In yet another example, when the recovery condition for the access point stored in the block list includes a lifetime, the electronic device 101 may operate, for example, a timer at the time of storing the corresponding access point in the block list, and may determine whether the recovery condition is deleted by identifying the recovery condition after the lifetime has elapsed.

According to an embodiment, when a designated event occurs while performing the connection operation with the candidate access point selected in operation 405, the electronic device 101 may store the corresponding candidate access point in the block list. For example, the designated event may include various situations in which communication cannot be performed by the corresponding candidate access point due to failures in connecting to the access point.

According to an embodiment, the electronic device 101 may store identification information of the candidate access point in which the designated event has occurred, in the block list. For example, the identification information of the candidate access point may be obtained from a signal received from the candidate access point. For example, the identification information of the candidate access point may include basic service set identifier (BSSID). For example, the identification information of the candidate access point may be obtained from the MAC address of the signal received from the candidate access point.

According to an embodiment, when the designated event occurs during connection with the second access point AP2, the electronic device 101 may configure a recovery condition according to the type of the event, and may store the recovery condition of the second access point AP2 together with the identification information in the block list. For example, the recovery condition of the access point stored in the block list may be configured based on the type of the event that occurred during connection with the corresponding access point, and may be based on the received signal strength and/or the lifetime. The event type and method of configuring the recovery condition according to the event type will be described in detail below with reference to FIGS. 5 to 9.

FIGS. 5 to 10 are diagrams illustrating examples of an event occurring during a connection between an electronic device and an access point according to certain embodiments of the disclosure, and methods of configuring a recovery condition according to the examples of the event.

Figure 5:
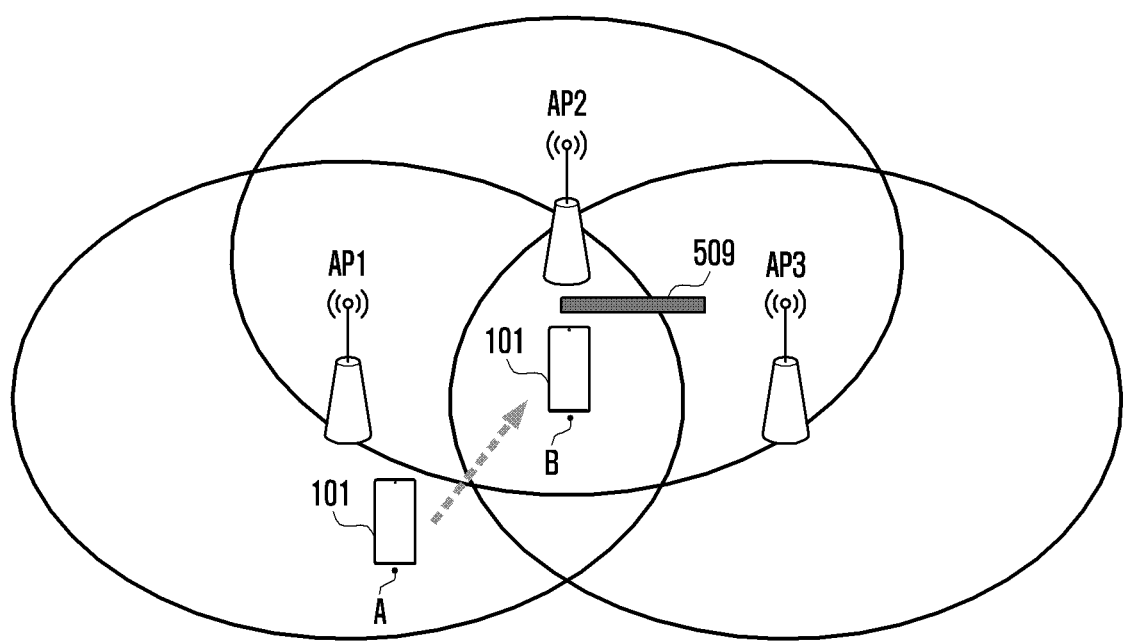
FIGS. 5 to 10 are diagrams illustrating examples of an event occurring during a connection between an electronic device and an access point according to certain embodiments of the disclosure.

Referring to FIG. 5, an event may occur in which an electronic device (e.g., the electronic device 101 of FIG. 1) according to an embodiment may not receive a response signal from a candidate access point while performing a connection operation with the candidate access point due to various reasons.

According to an embodiment, as the electronic device 101 is connected to the first access point AP1 and the received signal strength from the first access point AP1 decreases during communication, roaming may be triggered to search for a neighboring access point. For example, when the received signal strength from the first access point AP1 decreases as the electronic device 101 moves from a first location A to a second location B, the electronic device 101 may search for a neighboring access point, and thus, the second access point AP2 and the third access point AP3 may be searched.

According to an embodiment, the electronic device 101 may select, for example, the second access point AP2 as the candidate access point based on, for example, the received signal strengths of the searched access points, and may perform a connection operation with the second access point AP2.

According to an embodiment, an event may occur in which the electronic device 101 fails to receive a signal required for connection such as a response signal from the second access point AP2 while performing a connection operation with the second access point AP2.

FIGS. 6A to 6D illustrate examples of a first type of event in which the electronic device 101 according to an embodiment cannot receive a required signal from a roaming candidate access point 600 (e.g., the second access point AP2) resulting in a connection failure.

Figure 6A:
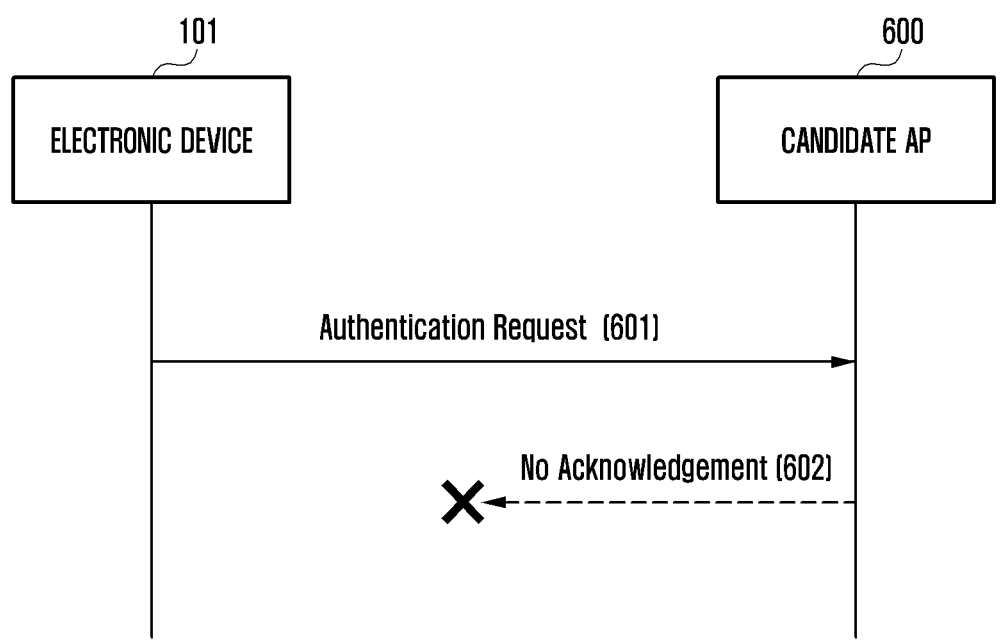
Figure 6B:
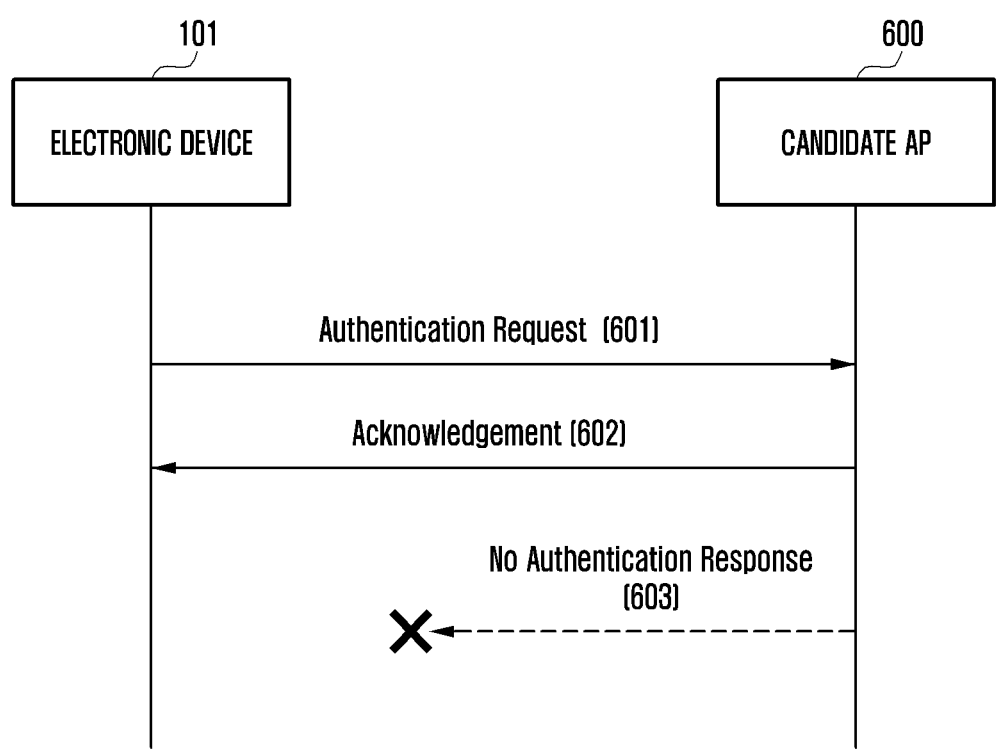
Figure 6C:
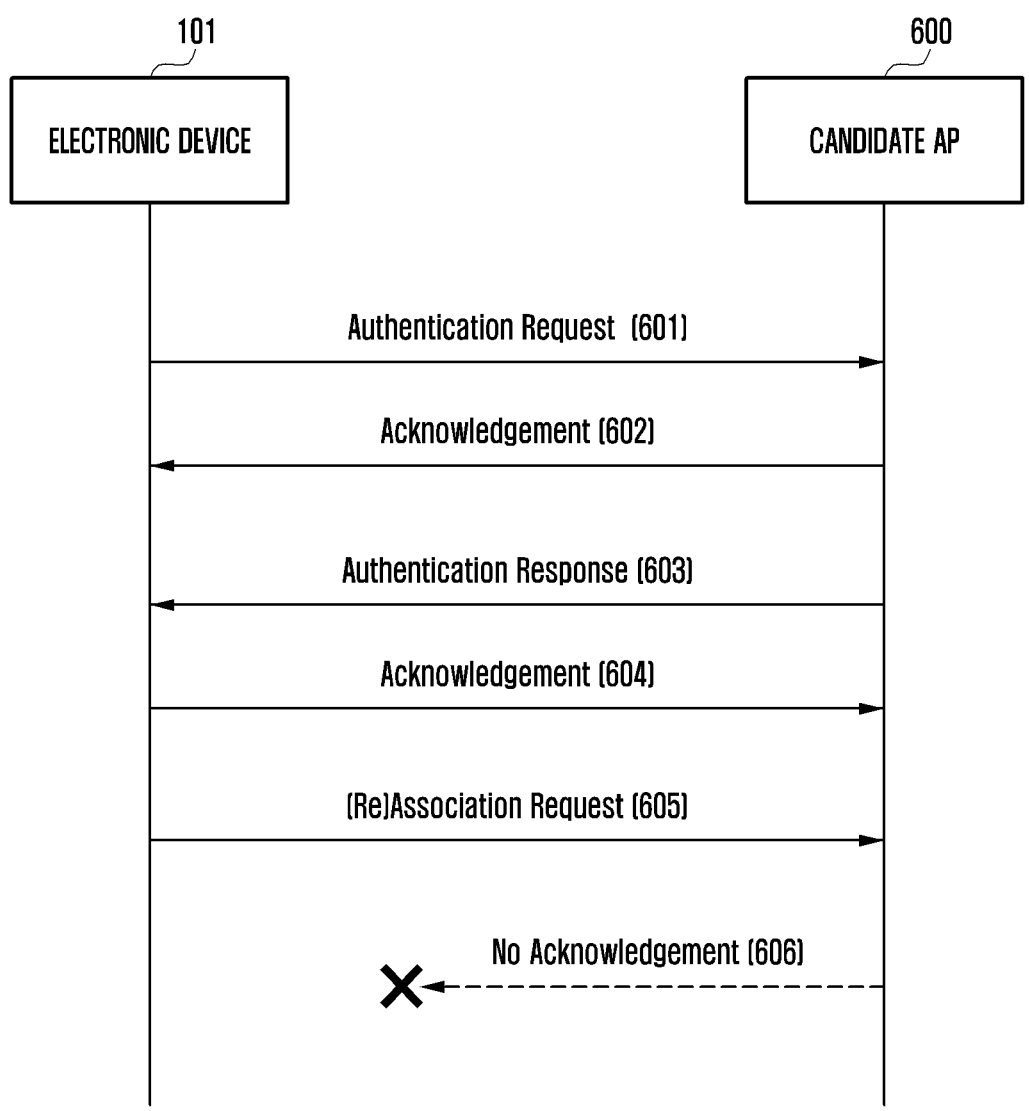
Figure 6D:
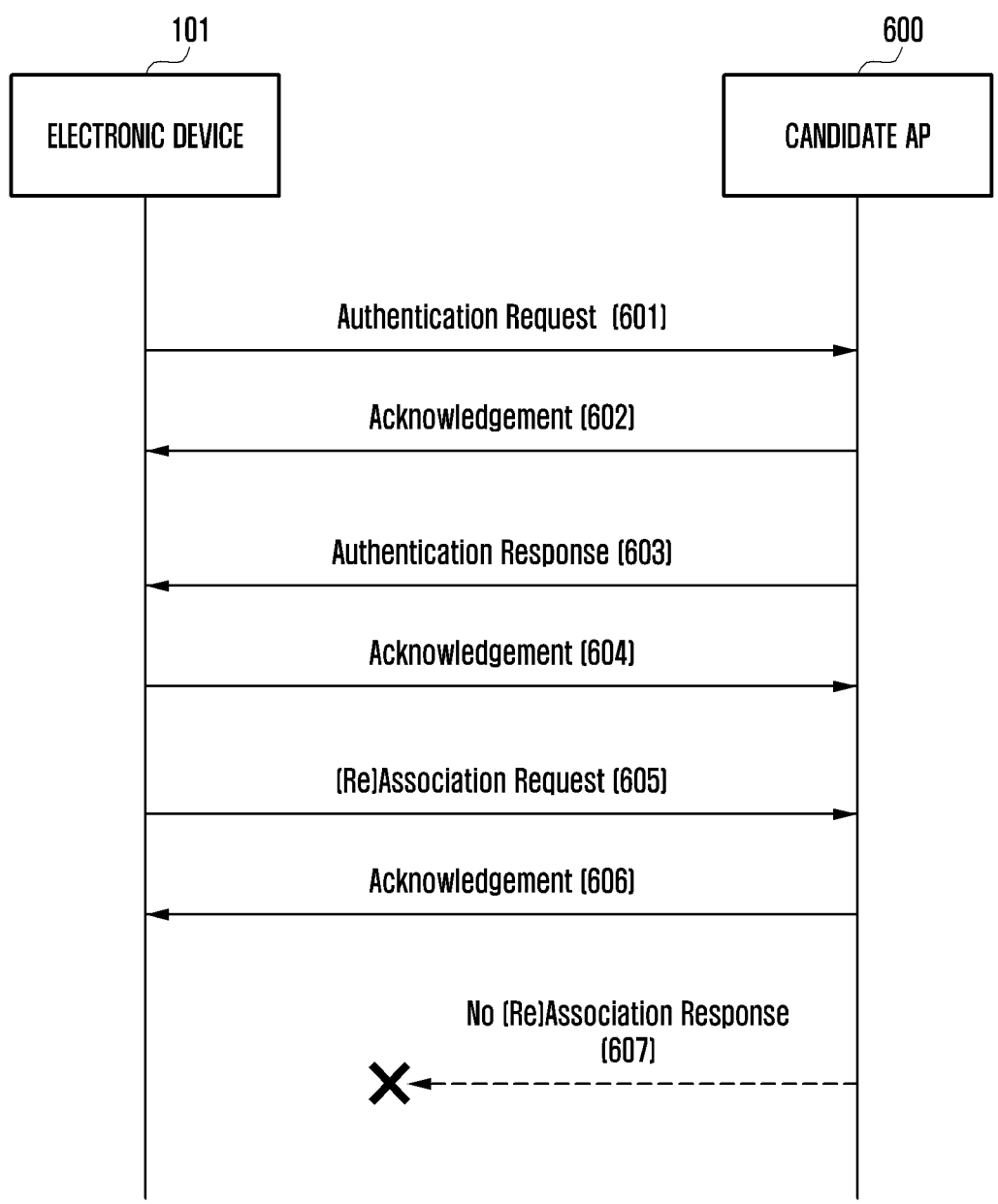

Referring to FIG. 6A, in an authentication operation, the electronic device 101 may transmit an authentication request frame 601 to the candidate access point 600 and may fail to receive an acknowledgement (ACK) frame 602 for the authentication request frame 601. Referring to FIG. 6B, after receiving the ACK frame 602 for the authentication request frame 601 transmitted to the candidate access point 600 by the electronic device 101, the electronic device 101 may fail to receive an authentication response frame 603. Referring to FIG. 6C, in an association (or reassociation) request operation, the electronic device 101 may fail to receive the ACK frame 606 for the transmitted association request frame or a reassociation request frame 605. Referring to FIG. 6D, after receiving an ACK frame for the association request frame or reassociation request frame 605 transmitted to the candidate access point 600 by the electronic device 101, the electronic device 101 may fail to receive an association response frame or reassociation response frame 607.

The first type of event in which the electronic device 101 according to an embodiment cannot receive the required signal from the candidate access point 600 results in connection failure, and has been described with reference to FIGS. 6A to 6D. The first type of event may occur for various reasons such as when the distance between the electronic device and the access point increases or failure (e.g., an obstacle 509 of FIG. 5) occurs in a wireless communication environment.

For example, the first type of event may occur when the access point 600 fails to receive a request or ACK signal transmitted by the electronic device 101 due to low transmission power.

As another example, the first type of event may occur when the candidate access point 600 receives a signal transmitted by the electronic device 101 but fails to transmit an ACK or response signal due to a problem occurring in the candidate access point 600.

In yet another example, the first type of event may occur when the ACK or response signal for the signal transmitted by the electronic device 101 is transmitted by the candidate access point 600 but the electronic device 101 fails to receive the ACK or response signal due to a problem (e.g., antenna performance problem or internal firmware problem) occurring in the electronic device 101.

According to an embodiment, in the case in which the first type of event occurs, when the received signal strength (e.g., RSSI) is higher than a level L of the received signal strength identified at the time of storing the candidate access point 600 in the block list by a designated first level L1 or higher, the electronic device 101 may configure the recovery condition so that the candidate access point may be deleted from the block list.

According to an embodiment, when the first type of event occurs, for example, the electronic device 101 may configure the recovery condition so that the candidate access point 600 may be deleted from the block list after a first lifetime T1 has elapsed, for example, starting from the time when the candidate access point 600 is stored in the block list. For example, when the electronic device 101 fails to receive the corresponding signal or the candidate access point 600 fails to transmit the corresponding signal due to a problem occurring in the electronic device 101 or the candidate access point 600, it is necessary to limit continuous connection attempts by preventing reconnection during the designated lifetime T1. For example, such a problem may be temporary problem, in which case the problem may be resolved after the lifetime has elapsed. But when the corresponding problem is not a temporary problem, the electronic device 101 may attempt to roam to another access point and prevent continuous connection attempts to the problematic same access point by using the block list.

According to an embodiment, as the recovery condition, a received signal strength condition and a lifetime condition may be applied together. According to an embodiment, in the case in which the first type of event occurs, when the received signal strength (e.g., RSSI) is higher than the level L of the received signal strength at the time of storing the candidate access point 600 in the block list by the designated level L1 or higher after the lifetime T1 has elapsed starting from the time when the candidate access point 600 is stored in the block list, the electronic device 101 may configure the recovery condition so that the candidate access point 600 may be deleted from the block list. For example, when the received signal strength of the candidate access point 600 identified at a location where the electronic device 101 has moved to after the first lifetime T1 has elapsed, which is configured in the recovery condition, is higher than the previous level L of the received signal strength of the candidate access point 600 by the configured first level L1 or higher, the electronic device 101 may delete the candidate access point 600 from the block list. As another example, in the case in which the electronic device 101 moves by a designated distance or greater, when the received signal strength of the candidate access point 600 is higher than the previous level L of the received signal strength by the designated first level L1 or higher before the first lifetime T1 configured in the recovery condition has elapsed, the electronic device 101 may delete the candidate access point 600 from the block list.

According to an embodiment, the first lifetime T1 may be configured to a constant value designated according to various characteristics of the wireless network. For example, the first lifetime T1 may be dynamically changed according to changes in the characteristics of the wireless network. For example, the lifetime T1 may be dynamically changed according to changes in the characteristics of the wireless network, such as the number, density, and/or coverage area of access points included in the wireless network.

According to an embodiment, in configuring the recovery condition for the access point added to the block list, the electronic device 101 may increase the above-described level value L1 and/or lifetime T1 value when there are many access points to be roamed in the vicinity of the electronic device 101, and may reduce, for example, the level condition L1 and/or the lifetime T1 value in an environment where there are few access points to be roamed in the vicinity thereof.

For example, the first lifetime T1 configured based on the first type of event may be configured to be a relatively shorter period than for other types of events, for example, 30 seconds.

Figure 7:
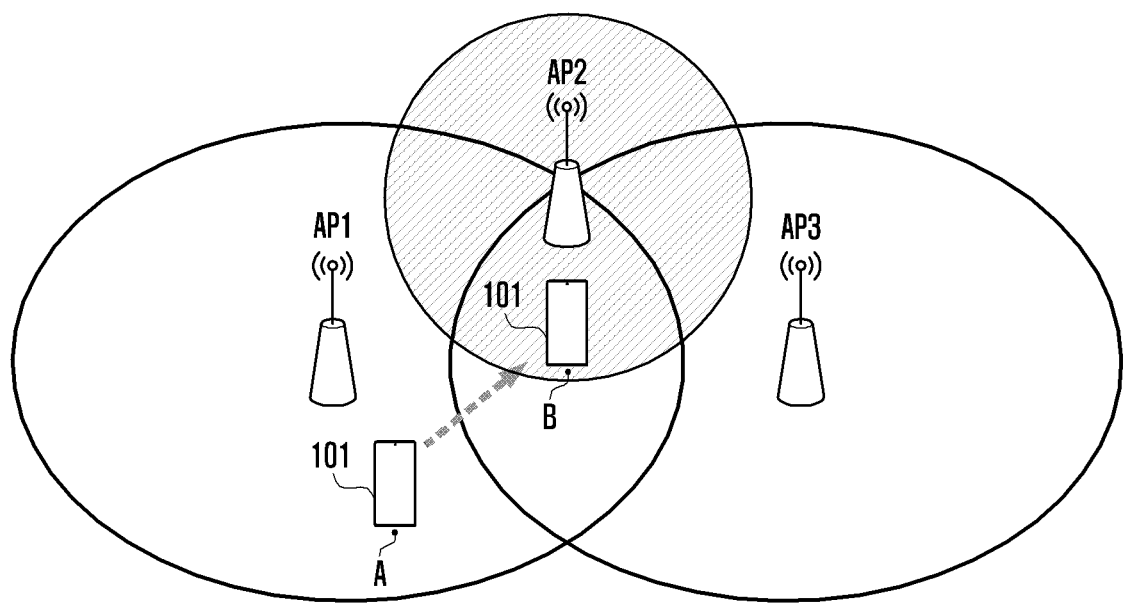

Referring to FIG. 7, a second type of event may occur in which the electronic device (e.g., the electronic device 101 of FIG. 1) according to an embodiment receives an authentication or association reject response frame from the candidate access point for various reasons while performing the connection operation with the candidate access point.

According to an embodiment, as the electronic device 101 is connected to, for example, the first access point AP1 and moves from a first location A to a second location B to be within the communication range of, for example, the second access point AP2, roaming may be triggered due to deterioration of the communication quality with the first access point AP1, and the electronic device 101 may search for (e.g., scanning) a neighboring access point at the second location B where the electronic device 101 has moved to.

According to an embodiment, the electronic device 101 may select the access point (e.g., the second access point AP2) having, for example, the highest received signal strength as the candidate access point from among the searched access points, and may attempt to connect to the corresponding access point.

According to an embodiment, the second access point AP2 may be, for example, a device equipped with band steering or client steering function capable of rejecting or accepting roaming requests from the electronic device 101. For example, in the case in which the second access point AP2 provides frequency bands of, for example, 2.4 GHz and 5 GHz, only when the authentication or association is requested in a frequency band of 5 GHz, the request may be accepted. When the authentication or association is requested in the frequency band of 2.4 GHz, the request may be rejected. As another example, when the second access point AP2 is an access point in a mesh access point (AP) environment in which a plurality of access points are installed or an access point included in an enterprise Wi-Fi network where there is a controller for controlling access points, the second access point AP2 may reject the connection request from the electronic device 101 so that the electronic device 101 cannot be connected to the second access point AP2.

Figure 8A:
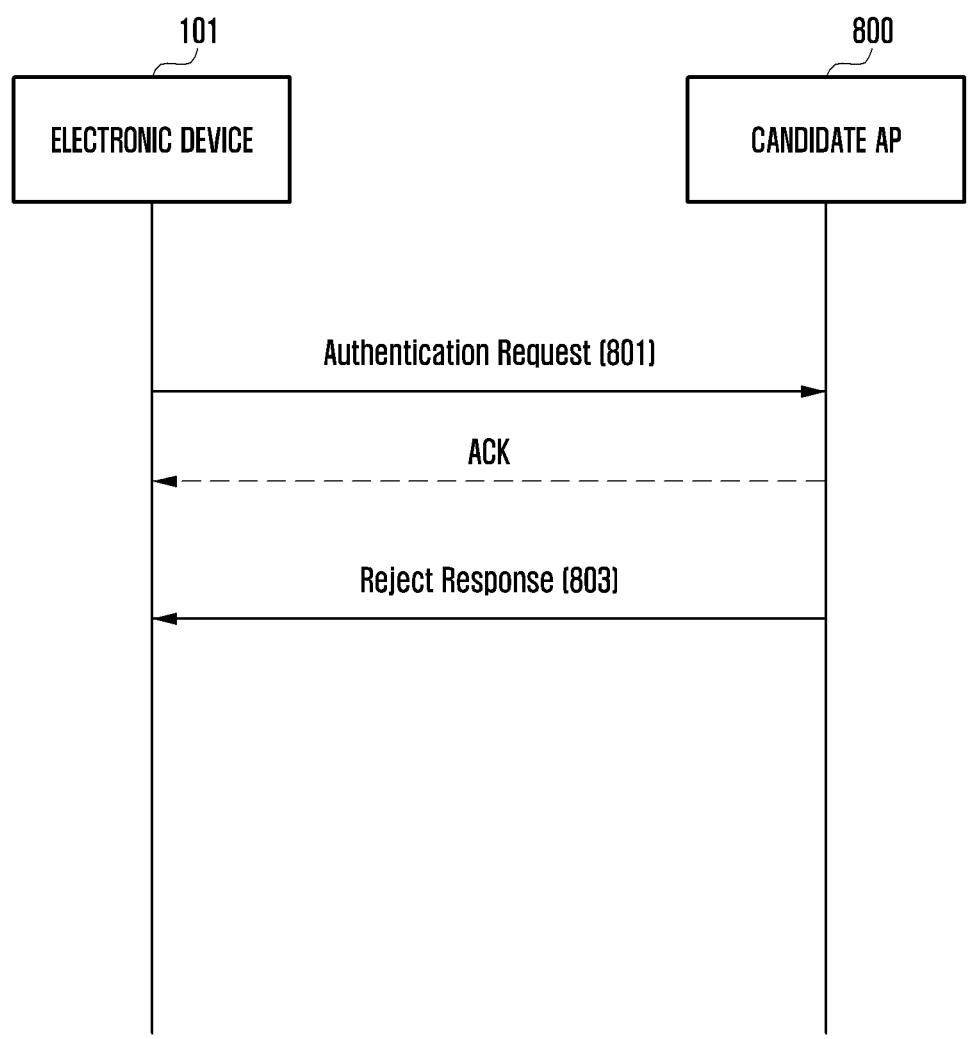
Figure 8B:
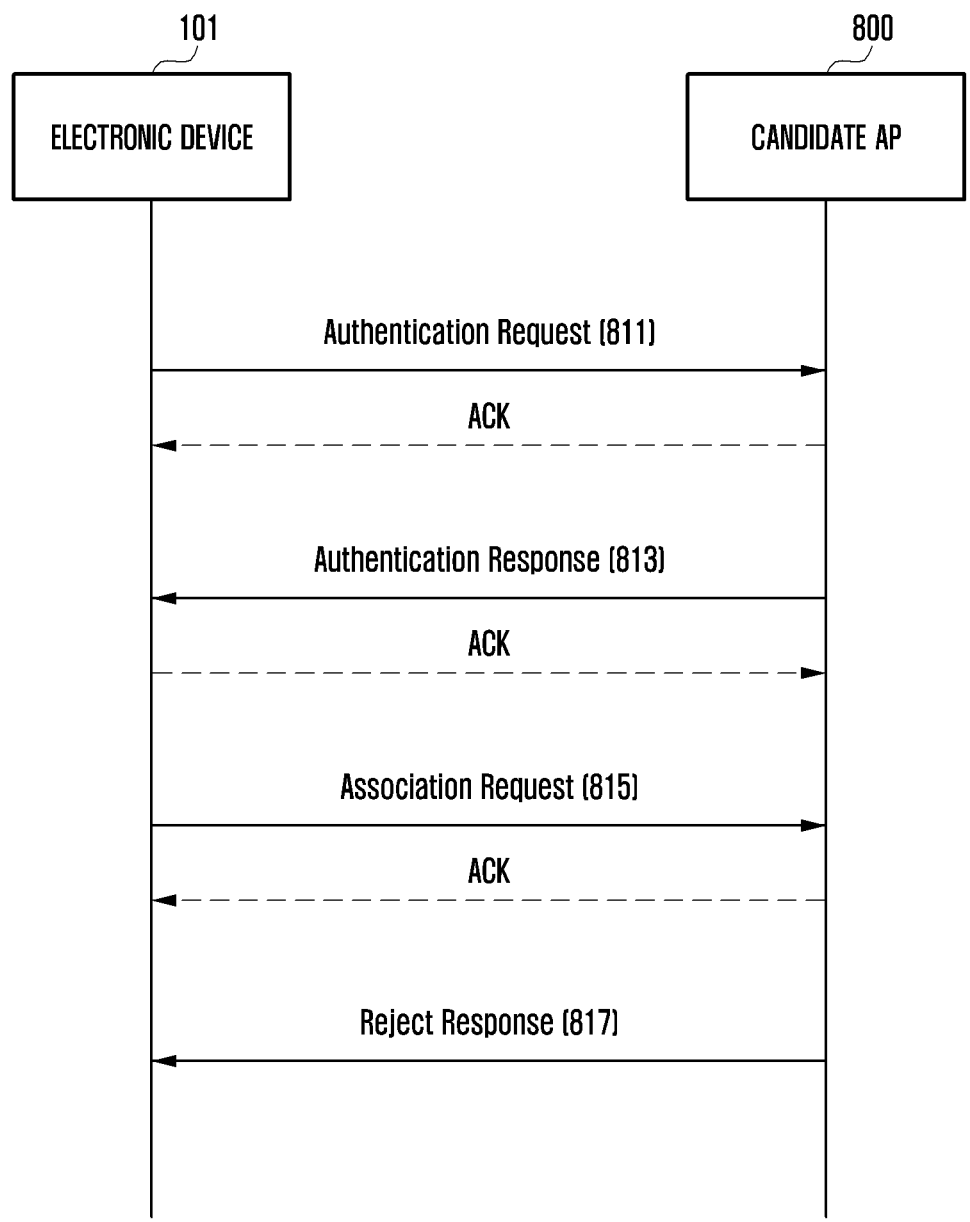

FIGS. 8A and 8B are diagrams illustrating examples in which a candidate access point according to certain embodiments transmits a connection reject signal.

Referring to FIG. 8A, a candidate access point 800 (e.g., the second access point AP2) may respond to an authentication request frame 801 transmitted by the electronic device 101 with an authentication reject frame 803.

Referring to FIG. 8B, the candidate access point 800 may receive an authentication request frame 811 from the electronic device 101, may transmit an authentication response frame 813 to complete an authentication operation, and may then transmit an association reject frame 817 to the electronic device 101 in response to the association request frame 815 received from the electronic device 101.

According to an embodiment, when the second type of event of receiving the request rejection signal from the candidate access point 800 occurs, the electronic device 101 may store the corresponding candidate access point 800 in the block list.

According to an embodiment, when the second type of event of receiving the request rejection signal from the candidate access point 800 occurs, the electronic device 101 may configure, for example, a lifetime T2 as the recovery condition for the candidate access point 800 and may store the configured lifetime T2 in the block list. According to an embodiment, the electronic device 101 may store the recovery condition in which the lifetime T2 is configured together with identification information (e.g., BSSID) of the access point 800, and thereafter, the electronic device 101 may exclude additional attempts to connect to the access point 800 during the lifetime T2 included in the recovery condition. For example, the electronic device 101 may exclude the access point 800 and may select another access point as the candidate access point during the lifetime T2 included in the recovery condition stored together with the BSSID of the access point 800 to perform a connection operation. According to an embodiment, even when there is no additional candidate access points outside the access point 800, the electronic device 101 may not to attempt a connection to the access point 800 at least included in the block list within the lifetime T2, which is the recovery condition.

According to an embodiment, the second lifetime T2 may be configured to be a constant value designated according to various characteristics of the wireless network. For example, the second lifetime T2 may be dynamically changed according to changes in the characteristics of the wireless network. For example, the second lifetime T2 may be dynamically changed according to changes in the characteristics of the wireless network, such as the number, density, and/or coverage area of the access points included in the wireless network. According to an embodiment, in configuring the recovery condition for the access point added to the block list, the electronic device 101 may increase the lifetime T2 value when there are many access points to be roamed in the vicinity of the electronic device 101, and may reduce the lifetime T2 value in the environment where there are few access points to be roamed in the vicinity thereof. According to an embodiment, the second lifetime T2 configured based on the second type of event may be configured relatively long compared to other types of events (e.g., the first type of event), for example, as a period of 1 minute.

Figure 9:
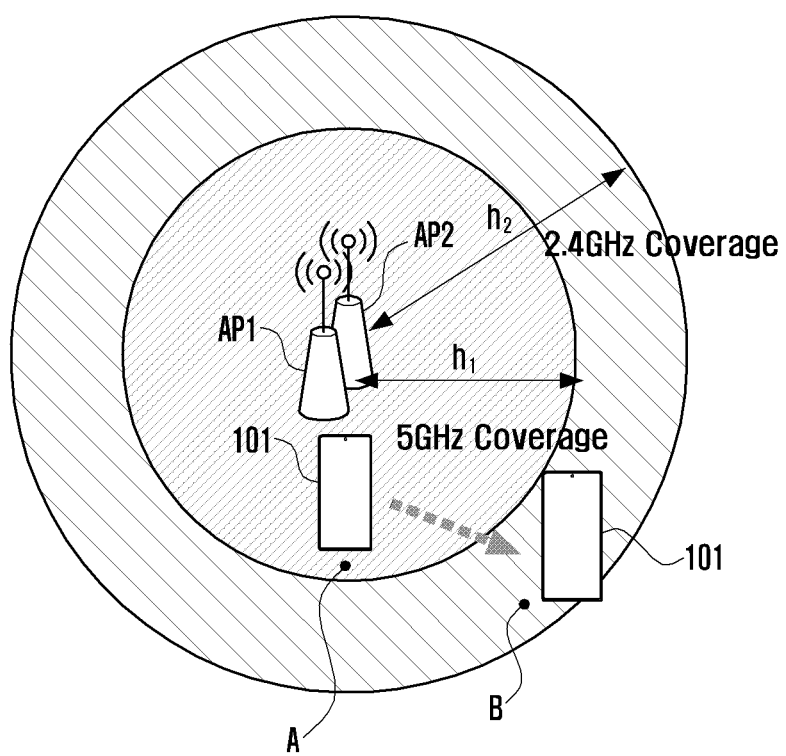
Figure 10:
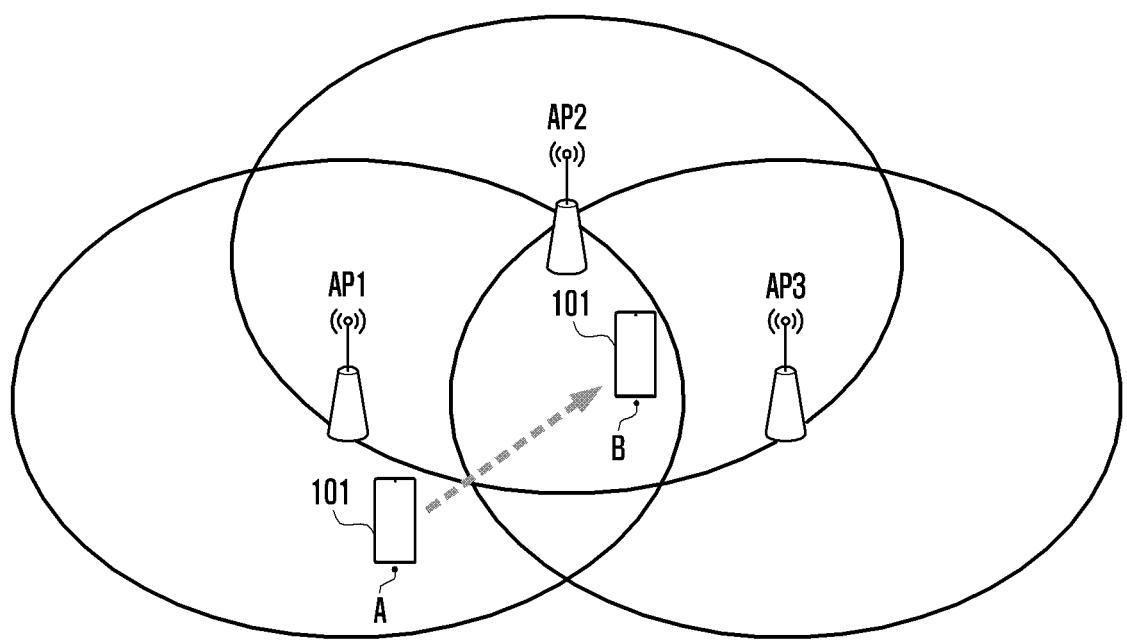

Referring to FIGS. 9 and 10, when various electronic devices (e.g., the electronic device 101 of FIG. 1) according to certain embodiments are provided, a third type of event may occur in which connection and disconnection for the candidate access point are repeated within a designated time period, one in which roaming connection with a candidate access point and roaming connection with another access point are repeated.

Referring to FIG. 9, an example is provided in which the electronic device 101 move to a second location B within the communication range (e.g., the area within the radius h2 larger than radius h1) of the second access point AP2 away from the first location A in the communication range (e.g., area within the radius h1) of the first access point AP1 providing frequency band of, for example, 5 GHz.

According to an embodiment, the electronic device 101 may attempt to roam as the signal quality from the first access point AP1 deteriorates, and may establish a connection with, for example, the searched second access point AP2.

According to an embodiment, when the first access point AP1 is a device equipped with band steering or client steering function, the first access point AP1 may designate its own identification information, for example, BSSID with respect to the electronic device 101 connected to the second access point AP2 and may request roaming to the first access point AP1 providing the frequency band of 5 GHz, from the electronic device 101. According to an embodiment, the first access point AP1 and the second access point AP2 may share information of the electronic device 101, and may request roaming to the first access point AP1 from the electronic device 101 when the electronic device transmits a connection request to the second access point AP2.

According to an embodiment, after the electronic device 101 establishes the connection with the first access point AP1 according to the band steering or client steering function, when the signal quality of the first access point AP1 for providing the frequency band of 5 GHz is still low, the electronic device 101 may trigger roaming again to perform connection to, for example, the second access point AP2. According to an embodiment, the electronic device 101 may include a communication circuit supporting the wireless communication of both frequency bands of 5 GHz and 2.4 GHz through one communication circuit, or a communication circuit supporting 5 GHz and a communication circuit supporting 2.4 GHz. For example, when the electronic device 101 supports the wireless communication in the frequency bands of 5 GHz and 2.4 GHz, the electronic device 101 may attempt to connect to the first access point AP1 providing the 5 GHz frequency band. In another example, when the first access point AP1 supports the wireless communication of the frequency bands of 5 GHz and 2.4 GHz and the electronic device 101 supports the wireless communication of the frequency bands of 5 GHz and 2.4 GHz, the first access point AP1 may request a connection to the first access point AP1 through the band of 5 GHz from the electronic device 101. According to an embodiment, as the electronic device 101 repeats roaming according to the received signal strength and the band steering or client steering function, roaming with the first access point AP1 and roaming with the second access point AP2 may be repeated for a short time, for example, within a designated time period (e.g., one minute), for example, two or more times R.

According to an embodiment, when the third type of event occurs, the electronic device 101 may store, for example, at least one of the first access point AP1 and the second access point AP2 in the block list.

According to an embodiment, when the third type of event occurs, the electronic device 101 may configure, for example, a third lifetime T3 as the recovery condition for at least one of the first access point AP1 and the second access point AP2, and may store the configured third lifetime T3 in the block list.

Referring to FIG. 10, an example is illustrated in which the electronic device 101 moves to the second location B within the communication range of the second access point AP2 and the third access point AP3 when the electronic device is connected to, for example, the first access point AP1 in the first location A. FIG. 10 illustrates a case in which signal quality is frequently changed at the second location B.

According to an embodiment, the electronic device 101 may attempt to roam as the signal quality from the first access point AP1 deteriorates, and may establish a connection with, for example, the found second access point AP2.

According to an embodiment, after the electronic device 101 establishes the connection with the second access point AP2, when the signal quality of the second access point AP2 is low, the electronic device 101 may trigger roaming again to perform a connection to the third access point AP3.

According to an embodiment, after the electronic device 101 establishes the connection with the third access point AP3, when the signal quality of the third access point AP3 is low, the electronic device 101 may trigger roaming to perform the connection to the second access point AP2 again.

According to an embodiment, when the received signal strength from the different access points of the electronic device 101 are similarly low, the electronic device 101 may repeat, for example, roaming between the second access point AP2 and the third access point AP3 within a designated time period (for example, one minute) T, for example, two or more times R.

According to an embodiment, when the third type of event occurs, the electronic device 101 may store, for example, at least one of the second access point AP2 and the third access point AP3 in the block list.

According to an embodiment, when the third type of event occurs, the electronic device 101 may configure, for example, a third lifetime T3 as the recovery condition for the at least one of the second access point AP2 and the third access point AP3, and may store the configured third lifetime T3 in the block list.

According to an embodiment, the third lifetime T3 may be configured to a constant value designated according to various characteristics of the wireless network. For example, the third lifetime T3 may be dynamically changed according to changes in the characteristics of the wireless network. For example, the third lifetime T3 may be dynamically changed according to the changes in the characteristics of the wireless network, such as the number, density, and/or coverage area of the access points included in the wireless network. According to an embodiment, in configuring the recovery condition for the access point added to the block list, the electronic device 101 may increase the lifetime T3 value when there are many access points to be roamed in the vicinity of the electronic device 101, and may reduce the lifetime T3 value in the environment where there are few access points to be roamed in the vicinity thereof.

Figure 11:
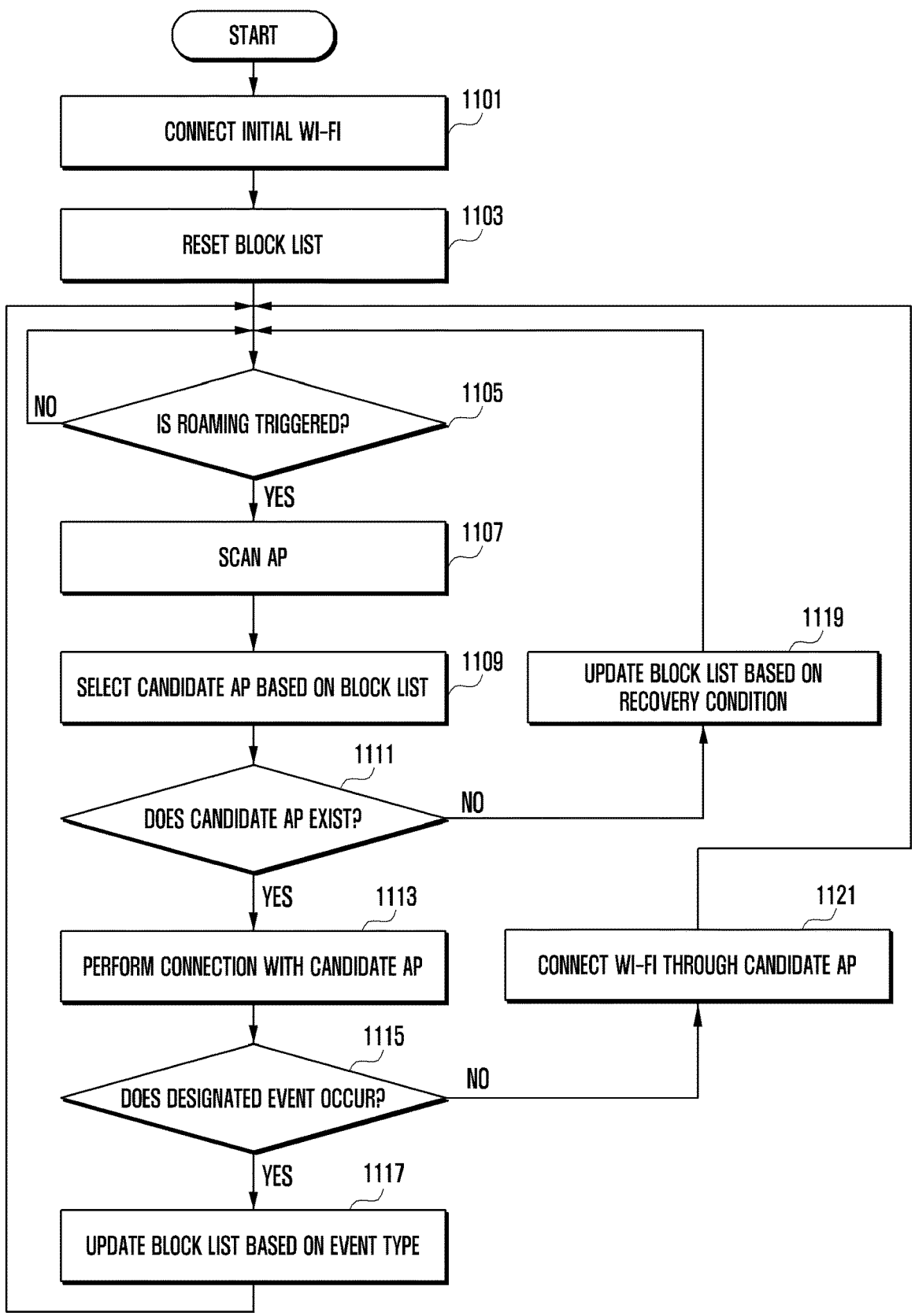
FIG. 11 is a flowchart illustrating a method for an electronic device to perform roaming by controlling a connection to an access point according to an embodiment of the disclosure.

FIG. 11 is a flowchart illustrating a method for an electronic device to perform roaming by controlling a connection to an access point according to an embodiment of the disclosure.

Referring to FIG. 11, in operation 1101, a processor (e.g., the processor 120 of FIG. 1) of an electronic device (e.g., the electronic device 101 of FIG. 1) according to an embodiment may be connected to one access point (e.g., the first access point AP1 of FIG. 2) included in a wireless network (e.g., Wi-Fi communication network) existing within a configured communication range, thereby performing data communication. For example, referring to FIG. 2, in order for the electronic device 101 to be initially connected to a wireless network through a wireless communication module (e.g., the wireless communication module 192 of FIG. 1), the processor 120 may search for (e.g., scanning) a connectable access point within the communication range through the wireless communication module, and may perform authentication and association request operations with, for example, the first access point AP1 from among the searched access points to establish a communication channel. The processor 120 may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Certain of the functions and steps provided in the Figures may be implemented in hardware, software or a combination of both and may be performed in whole or in part within the programmed instructions of a computer. No claim element herein is to be construed as means-plus-function, unless the element is expressly recited using the phrase "means for." In addition, an artisan understands and appreciates that a "processor" or "microprocessor" may be hardware in the claimed disclosure.

According to an embodiment, in operation 1103, the electronic device 101 may reset the block list stored in a memory (e.g., the memory 130 of FIG. 1). For example, when the electronic device 101 is connected to the wireless network for the first time, the electronic device 101 may reset the block list. For example, together with or after the connection operation before performing a connection operation with the first access point AP1 first connected, the electronic device 101 may reset the block list. For example, the block list may include data generated and/or updated according to previous connections to other wireless networks, and may be reset when a new wireless network is encountered.

According to an embodiment, the processor 120 may determine whether a condition for performing roaming has occurred by identifying the channel communication quality at a designated period in operation 1105 while performing communication with the first access point AP1. For example, when the communication quality with the first access point AP1 decreases as the electronic device 101 or the first access point AP1 moves or when an obstacle is presented in the vicinity of the electronic device 101 and the first access point AP1, roaming may be triggered.

According to an embodiment, when roaming is triggered, the processor 120 may search for a neighboring access point in operation 1107. For example, the electronic device 101 may broadcast a scan request signal and may receive a scan response signal from a neighboring access point within a communication range in response thereto, or may receive a beacon signal periodically transmitted by the neighboring access point existing within the communication range. For example, the electronic device 101 may receive the scan response signal or the beacon signal from the second access point AP2 and the third access point AP3 of FIG. 2 through searching for the neighboring access point.

According to an embodiment, in operation 1109, the processor 120 may select a candidate access point from among the searched neighboring access points based on the block list. According to an embodiment, in operation 1111, when the candidate access point exists (Yes in operation 1111), the processor 120 may perform a connection operation with the selected candidate access point in operation 1113.

According to an embodiment, when the second access point AP2 and the third access point AP3 are searched for in operation 1109, the processor 120 may exclude the access point stored in the block list from among the searched second access point AP2 and third access point AP3, and may select the candidate access point from among the remaining access points. For example, the selection condition of the candidate access point may include a condition in which the received signal strength is greater than or equal to a designated strength.

According to an embodiment, the processor 120 may perform operations required for connection with the selected candidate access point (e.g., the second access point AP2), for example, the authentication and association request operations while performing communication through a connection with the first access point AP1.

According to an embodiment, in operation 1115, the processor 120 may determine whether a designated event occurs while performing the connection operation with the candidate access point selected in operation 1115. For example, the designated event may include various types (e.g., the first event type to the third event type disclosed above) for which communication cannot be performed by successfully connecting with the corresponding candidate access point. According to an embodiment, when the designated event occurs, in operation 1117, the processor 120 may update the block list by storing information related to the corresponding candidate access point based on the event type. For example, the information related to the candidate access point stored in the block list may include identification information of the candidate access point and may further include a recovery condition according to the event type. For example, the recovery condition according to the event type for the candidate access point stored in the block list may be configured based on the event type that occurred during connection with the corresponding access point, and may include a condition for the received signal strength and/or time including the lifetime. The event type and the method of configuring the recovery condition have been described above with reference to FIGS. 5 to 9, and detailed description thereof will be omitted below.

According to an embodiment, when there is no candidate access point in operation 1111, the processor 120 may proceed to operation 1119 to identify the recovery condition designated for each access point stored in the block list, and when the recovery condition is satisfied, the corresponding access point may be deleted from the block list and update may be performed. For example, the processor 120 may identify the recovery condition for the access point stored in the block list when there is no candidate access point as illustrated, but is not limited thereto. According to an embodiment, the processor 120 may periodically configure the recovery condition for the access point stored in the block list, or may configure an individual timer for the individual access point. When a designated time period elapses or roaming is triggered, the point in time when the access point is searched may be identified and the block list may be updated.

According to an embodiment, when the connection operation with the candidate access point is performed in operation 1113 and the designated event does not occur in operation 1115, the processor 120 may perform data communication through a wireless communication connection with the candidate access point in operation 1121.

According to an embodiment, an electronic device (e.g., the electronic device 101 of FIG. 1) may include a communication circuit (e.g., the communication circuit 190 of FIG. 1), a memory (e.g., the memory 130 of FIG. 1), and a processor (e.g., the processor 120 of FIG. 1) configured to be operatively connected to the communication circuit 190 and the memory 130, wherein the processor 120 may be configured to control the communication circuit 190 to perform wireless communication through a first access point (e.g., the first access point AP1 of FIG. 2), to search for another access point (e.g., the second access point AP2 and/or the third access point AP3) while performing communication through the first access point AP1, to attempt to connect to a candidate access point (e.g., the candidate access point 600 of FIGS. 6A to 6D or the candidate access point 800 of FIGS. 8A to 8b) selected based on a block list stored in the memory 130, and to store, when a designated event occurs while attempting to connect to the candidate access point 600 or 800, a recovery condition configured according to a type of the designated event together with identification information of the candidate access point 600 or 800 in the block list.

According to an embodiment, the recovery condition may include at least one of a condition for a received signal strength for the candidate access point 600 or 800 and a condition for a lifetime.

According to an embodiment, the processor 120 may be configured to configure at least one of the condition for the received signal strength and the condition for the lifetime based on the type of the designated event.

According to an embodiment, the processor 120 may be configured to dynamically change and configure at least one of the condition for the received signal strength and the condition for the lifetime according to a change in characteristics of a wireless network of the candidate access point 600 or 800.

According to an embodiment, the characteristics of the wireless network may include the number, density, and/or coverage area of a plurality of access points included in the wireless network.

According to an embodiment, the processor 120 may be configured to determine whether to delete the candidate access point 600 or 800 from the block list based on the recovery condition stored in the block list when there is no access point satisfying a selection condition while the candidate access point 600 or 800 is excluded by being in the block list.

According to an embodiment, the type of the designated event may include a type in which a signal is not received from the candidate access point 600 or 800 within a first designated time period, a type in which a connection reject response is received from the candidate access point 600 or 800, and a type in which connection and disconnection with the candidate access point 600 or 800 are repeated within a second designated time period.

According to an embodiment, the designated event may include a type in which a signal is not received from the candidate access point 600 or 800 within a designated time period, the recovery condition may include the condition for the received signal strength and the condition for the lifetime, and the processor 120 may be configured to determine to delete the candidate access point 600 or 800 from the block list when a strength of a signal received from the candidate access point 600 or 800 satisfies the condition for the received signal strength of the recovery condition and when the lifetime has elapsed.

According to an embodiment, the designated event may include a type of receiving an authentication or association reject response from the candidate access point 600 or 800, the recovery condition may include the condition for the lifetime, and the processor 120 may be configured to determine whether to delete the candidate access point 600 or 800 from the block list after the lifetime included in the recovery condition has elapsed.

According to an embodiment, the designated event may include a type in which connection and disconnection with the candidate access point 600 or 800 are repeated within a designated time period, the recovery condition may include the condition for the lifetime, and the processor 120 may be configured to determine whether to delete the candidate access point 600 or 800 from the block list after the lifetime included in the recovery condition has elapsed.

Certain of the above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

The embodiments disclosed in this document are only presented as examples for easy explanation and understanding of technical content, and are not intended to limit the scope of the technology disclosed in this document. Therefore, the scope of the technology disclosed in this document should be construed to include all changes or modifications derived based on the technical ideas of various embodiments disclosed in this document in addition to the embodiments disclosed herein.

The invention claimed is:

1. An electronic device comprising:
a communication circuit;
a memory; and
a processor configured to be operatively connected to the communication circuit and the memory,
wherein the processor is configured to:
control the communication circuit to perform wireless communication through a first access point,
search for another access point while performing communication through the first access point, and attempt to connect to a candidate access point selected based on a block list stored in the memory, and
store, when a designated event occurs while attempting to connect to the candidate access point, a recovery condition configured according to a type of the designated event together with identification information of the candidate access point in the block list, and
wherein:
the designated event, which is a situation where normal communication with the candidate access point cannot be performed due to a failure in connecting to the candidate access point, includes a type in which connection and disconnection with the candidate access point are repeated within a designated time period, and the recovery condition includes a condition for a lifetime, and
the processor is configured to determine whether to delete the candidate access point from the block list after the lifetime included in the recovery condition has elapsed.

2. The electronic device of claim 1, wherein the recovery condition includes at least one of a condition for a received signal strength for the candidate access point or a condition for a lifetime.

3. The electronic device of claim 2, wherein the processor is configured to configure at least one of the condition for the received signal strength or the condition for the lifetime based on the type of the designated event.

4. The electronic device of claim 3, wherein the processor is configured to dynamically change at least one of the condition for the received signal strength or the condition for the lifetime according to a change in characteristics of a wireless network of the candidate access point.

5. The electronic device of claim 4, wherein the characteristics of the wireless network include number, density, and/or coverage area of a plurality of access points included in the wireless network.

6. The electronic device of claim 3, wherein the processor is configured to determine whether to delete the candidate access point from the block list based on the recovery condition stored in the block list when there is no access point satisfying a selection condition while the candidate access point is excluded by being in the block list.

7. The electronic device of claim 1, wherein the type of the designated event includes a type in which a signal is not received from the candidate access point within a first designated time period, a type in which a connection reject response is received from the candidate access point, and a type in which connection and disconnection with the candidate access point are repeated within a second designated time period.

8. The electronic device of claim 1, wherein:
the designated event includes a type in which a signal is not received from the candidate access point within a designated time period, and the recovery condition includes a condition for a received signal strength for the candidate access point and a condition for a lifetime, and
the processor is configured to determine to delete the candidate access point from the block list when a strength of a signal received from the candidate access point satisfies the condition for the received signal strength of the recovery condition and when the lifetime has elapsed.

9. The electronic device of claim 1, wherein:
the designated event includes a type of receiving an authentication or association reject response from the candidate access point, and the recovery condition includes a condition for a lifetime, and
the processor is configured to determine whether to delete the candidate access point from the block list after the lifetime included in the recovery condition has elapsed.

10. A method of an electronic device, the method comprising:
performing wireless communication through a first access point;
searching for another access point while performing communication through the first access point, and attempting to connect to at least one candidate access point selected based on a block list stored in a memory of the electronic device;
storing, when a designated event occurs while attempting to connected the at least one candidate access point, a recovery condition configured according to a type of the designated event together with identification information of the at least one candidate access point in the block list, and
wherein the designated event, which is a situation where normal communication with the candidate access point cannot be performed due to a failure in connecting to the candidate access point, includes a type in which connection and disconnection with the at least one candidate access point are repeated within a designated time period, and the recovery condition includes a condition for a lifetime, and
determining whether to delete the at least one candidate access point from the block list after the lifetime included in the recovery condition has elapsed.

11. The method of claim 10, wherein the recovery condition includes at least one of a condition for a received signal strength for the at least one candidate access point or a condition for a lifetime.

12. The method of claim 11, wherein the storing in the block list includes configuring at least one of the condition for the received signal strength or the condition for the lifetime based on the type of the designated event.

13. The method of claim 12, wherein the storing in the block list includes dynamically changing at least one of the condition for the received signal strength or the condition for the lifetime according to a change in characteristics of a wireless network of the at least one candidate access point.

14. The method of claim 13, wherein the characteristics of the wireless network includes number, density, and/or coverage area of a plurality of access points included in the wireless network.

15. The method of claim 12, further comprising:
determining whether to delete the at least one candidate access point from the block list based on the recovery condition stored in the block list when there is no access point satisfying a selection condition while the at least one candidate access point is excluded by being in the block list.

16. The method of claim 10, wherein the type of the designated event includes a type in which a signal is not received from the at least one candidate access point within a first designated time period, a type in which a connection reject response is received from the at least one candidate access point, and a type in which connection and disconnection with the at least one candidate access point are repeated within a second designated time period.

17. The method of claim 10, wherein the designated event includes a type in which a signal is not received from the at least one candidate access point within a designated time period, and the recovery condition includes a condition for a received signal strength for the at least one candidate access point and a condition for a lifetime,
the method further comprising:
determining to delete the at least one candidate access point from the block list when a strength of a signal received from the at least one candidate access point satisfies the condition for the received signal strength of the recovery condition and when the lifetime has elapsed.

18. The method of claim 10, wherein the designated event includes a type of receiving an authentication or association reject response from the at least one candidate access point, and the recovery condition includes a condition for a lifetime,
the method further comprising:
determining whether to delete the at least one candidate access point from the block list after the lifetime included in the recovery condition has elapsed.

* * * * *